C. A. LONNECKER.
CORN REPLANTER.
APPLICATION FILED AUG. 11, 1908.
935,528.
Patented Sept. 28, 1909.
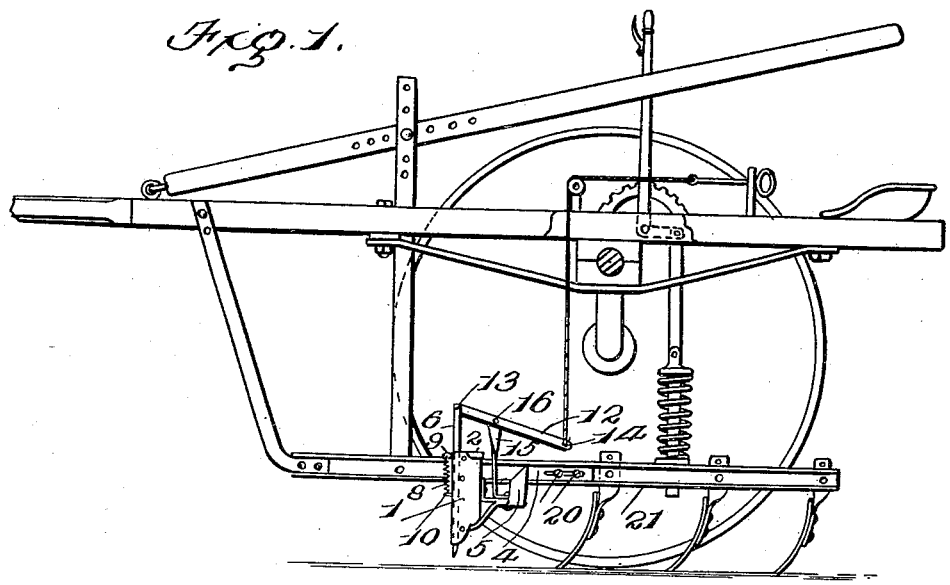
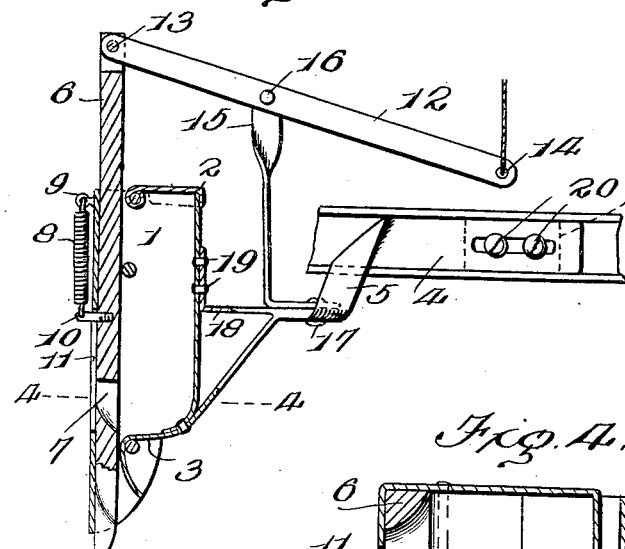
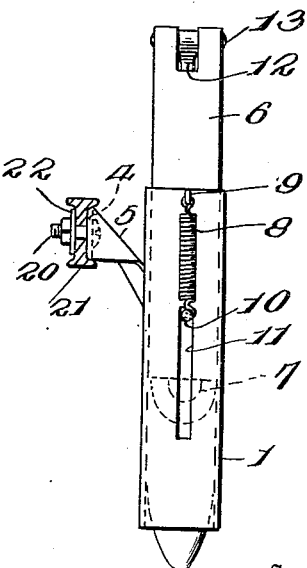
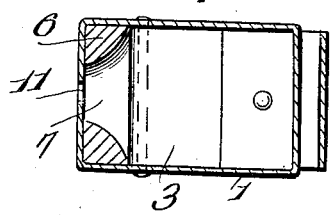
Witnesses
Inventor
C. A. Lonnecker
By
Attorneys

UNITED STATES PATENT OFFICE.

CHARLES A. LONNECKER, OF ARISPE, IOWA.

CORN-REPLANTER.

935,528.  Specification of Letters Patent.  Patented Sept. 28, 1909.

Application filed August 11, 1908. Serial No. 447,983.

*To all whom it may concern:*

Be it known that I, CHARLES A. LONNECKER, a citizen of the United States, residing at Arispe, in the county of Union and State of Iowa, have invented certain new and useful Improvements in Corn-Replanters, of which the following is a specification.

My invention relates to various new and useful improvements in corn replanters and the object of the invention is to provide a constructively cheap and durable device whereby corn or other seeds may be replanted at the will of the operator.

In the cultivation of corn, pumpkins, etc., it frequently becomes necessary to replant the seeds owing to their decay or for other reasons and this I accomplish by a novel arrangement and combination of parts whereby the replanting device may be adjustably attached to any and all cultivators now in use.

A further object of my invention is to provide a device particularly constructed to effect the quick transmission of the seed from the hopper to the ground insuring accuracy in replanting and eliminating in many instances the original cause of non-growth.

In order that my invention may be better understood, attention is directed to the accompanying drawings forming a part of the specification, and in which:—

Figure 1 is a side elevation showing the device attached to an ordinary cultivator; Fig. 2 is a vertical sectional view of the hopper; Fig. 3 is a front elevation of the hopper showing the location of springs and slot; and, Fig. 4 is a section of the hopper on the line 4—4 of Fig. 2.

In the above views, corresponding parts are represented by the same numerals of reference.

For the purpose of illustration, the attachment is shown as being adjustably secured to the beam of an ordinary cultivator, occupying a position slightly in advance of the shovels and in slightly offset relation thereto, it being understood that such modifications necessary to adapt it for use on specially constructed cultivators may be made within the scope of the invention.

1 represents a quadrangular shaped hopper, made of any suitable material, having a hinged lid or cover 2 and a bottom 3, formed by the lower portion of the brace attachment bar 4 and held in place as by a bolt or rod passing through the sides of the hopper, as shown. The said bar 4 is twisted transversely at 5 to acquire the necessary relative position of the hopper to the shovel.

6 designates a plunger working in the hopper 1 and having an aperture 7 sufficiently large to take a seed. In order to restore the plunger 6 to its normal position, a coil spring 8 is secured by a hook 9 to the top of the hopper 1, the other end of said spring being secured by a similar hook 10 to the plunger 6. The hook 10 works through a slot 11 in the hopper 1, thereby allowing free movement to the plunger 6. The said plunger 6, at its lower end, is sharpened to form a furrow in the earth and at its uppermost end is securely fastened to the operating bar 12 by means of a bolt 13. The bar 12 is formed with a hole 14 by which the bar may be actuated through the instrumentality of a rope in the hands of the operator or by other suitable means. A brace 15 for supporting and holding the operating bar 12 vertically in position, is secured thereto by a bolt 16, the other end of the brace being similarly fastened to the brace attachment bar 4 by a bolt 17. A brace 18 secured to the side of the hopper 1 by bolts 19 is employed to hold the hopper rigidly in place.

20 designates bolts passing through the brace attachment bar 4, the plow beam 21 and clamp plate 22 for attaching and securely holding the device in its proper position on the cultivator.

With the arrangement shown, the operation is as follows:—When it is desired to replant a seed, the operator by suitable means, as by a rope attached to the end of the operating bar 12, forces the plunger 6 in a downward direction, the point of the plunger entering the earth in its downward movement makes a furrow for the reception of the seed carried in the aperture 7 and the seed being released upon passing the bottom of the hopper 3 drops into the furrow and is covered with earth by the shovels. The plunger 6 is returned to its normal position by the spring 8 upon the release of the operating bar 12, the entire operation being extremely simple and accomplished with the greatest possible accuracy.

Having thus described the invention, what is claimed as new is:—

1. In a device as specified, the combination with a cultivator of a supporting bar adjustably carried by said cultivator, a hopper positioned on said bar, a plunger slidably disposed through said hopper having a recess formed therein for the reception of seed, said plunger also having a sharpened lower extremity, a brace upwardly extended from said supporting bar curved over said receptacle, and a lever fulcrumed on said brace and engaged at one extremity to the upper end of said plunger for the purpose of operating the same.

2. A device as specified comprising a hopper, a supporting bar extended from said hopper for attachment to a cultivator, a plunger slidably and vertically disposed through said hopper, a hook projected from said plunger through said hopper, a spring disposed between the outer extremity of said hook and the outer end of said hopper for holding said plunger normally upward, said plunger having a recess for engaging seed and carrying the same from said hopper, said plunger also having a pointed extremity for engagement with the ground to form a furrow, and a lever pivotally disposed about said receptacle and connected to said plunger for operating the same.

In testimony whereof I affix my signature in presence of two witnesses.

CHARLES A. LONNECKER. [L. S.]

Witnesses:
F. M. BEALL,
CARLTON SNYDER.